United States Patent [19]

Miller

[11] 4,456,046
[45] Jun. 26, 1984

[54] HIGH-SPEED TIRES

[76] Inventor: Timothy I. Miller, 3848 Greenfield Rd., Uniontown, Ohio 44685

[21] Appl. No.: 262,238

[22] Filed: May 11, 1981

[51] Int. Cl.³ .............................................. B60C 11/00
[52] U.S. Cl. ............................ 152/209 R; 152/354 R; 152/361 R; D12/146
[58] Field of Search ........... 152/209 R, 209 D, 209 B, 152/209 NT, 209 WT, 330 R, 354 R, 361 R, 209 A; D12/140, 147, 146

[56] References Cited

U.S. PATENT DOCUMENTS

| | | | |
|---|---|---|---|
| D. 54,912 | 4/1920 | Grote | D12/147 |
| D. 92,418 | 8/1934 | Miller | 152/209 D |
| D. 157,953 | 4/1950 | Hawkinson | 152/209 D |
| 2,014,255 | 9/1935 | King | 152/209 R |
| 3,584,670 | 6/1971 | Verdier | 152/209 R |
| 4,057,089 | 11/1977 | Johannsen | 152/209 R |
| 4,254,811 | 3/1981 | Devaux | 152/209 D |
| 4,282,915 | 8/1981 | Fontaine | 152/209 R |
| 4,299,264 | 11/1981 | Williams | 152/209 R |
| 4,356,985 | 11/1982 | Yeager et al. | 152/209 R X |

*Primary Examiner*—William A. Powell
*Assistant Examiner*—Thomas Bokan

[57] ABSTRACT

A high-speed tire for use during both wet and drying road surface conditions is disclosed. The tread groove depth increases from a minimum depth near each tread edge to a maximum depth near the mid-circumferential plane. Each of an outer group of tread elements has a ground-contacting surface area equal to at least about two square inches, and the net-to-gross ratio of the tread central zone is not greater than about 65 percent. Transverse grooves extend from the mid-circumferential plane to a tread edge at an angle relative to the mid-circumferential plane which is greater than about 75 degrees at the respective tread edge and which is less than about 40 degrees at the mid-circumferential plane. The widths of circumferential grooves progressively decrease as their respective distances from the mid-circumferential plane increase.

33 Claims, 3 Drawing Figures

HIGH-SPEED TIRES

The foregoing abstract is not to be taken as limiting the invention of this application, and in order to understand the full nature and extent of the technical disclosure of this application, reference must be made to the accompanying drawings and the following detailed description.

This invention relates to tires, and more particularly, high-speed tires such as racing tires.

A normal racing tire for use on dry track surfaces is slick; that is, it has no tread pattern whatsoever except for very small wear indicator depressions in the tread surface. A racing tire employing a tread pattern which has wide, deep, closely spaced grooves throughout the width and circumference of the tread has been employed during periods of time in road racing when it is raining or the track is wet, since it is necessary during such periods to remove rapidly from between the tire and the track surface the large quantities of water being accumulated as the tire goes through the footprint so as to prevent skidding or hydroplaning and to afford sufficient traction. Road racing is a type of racing which includes many combinations of left and right turns and which normally takes place in varied weather conditions. Since the tread elements of such a tire have a large height and a small surface area, they tend to squirm or otherwise distort especially in the shoulder regions and thereby generate heat as the tire travels through the footprint especially during periods of continuous cornering. During a period of time while the tire is contacting a wet track surface, the water being evacuated keeps the tread elements sufficiently cool so that the tire tread is generally not damaged. However, during periods of time when the track is dry or drying, there may be insufficient cooling of the tread elements during high-speed use of a tire with such a tread, especially during periods of continuous cornering, resulting in blistering of the tread elements, especially in the shoulder regions of the tire.

For these reasons, it has been considered necessary in the past to provide two types of tires for road racing during overcast weather conditions wherein the track surface is wet and may begin drying or is dry and may become wet during a race. One type of tire would be used when the track is wet and the other type would be used when the track is dry or drying. However, the time required to change tires after a rain or when a rain begins may be crucial to the outcome of a race. It is therefore desirable to provide a racing tire which has sufficient water evacuation capacity for use on a wet track but which will also not be damaged due to blistering of the tread elements during cornering when the track is dry or drying.

It is an object of the present invention to provide such a tire. Other objects of this invention will become apparent hereinafter.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
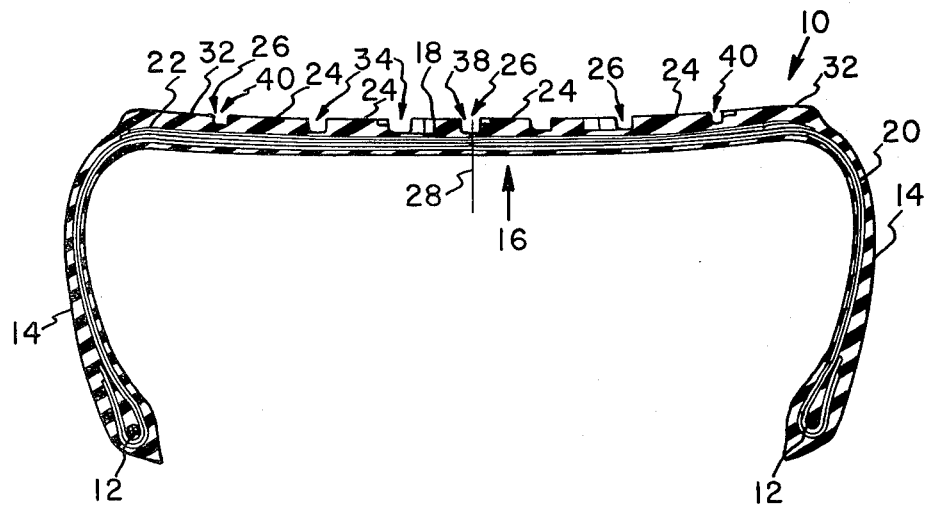
FIG. 1 is a cross-section of a tire embodying this invention.

There is shown in FIG. 1 a tire 10 which is a toroidal-shaped composite structure provided with a pair of conventional, circular, inextensible beads 12 from which extend respectively a pair of sidewalls 14. The sidewalls 14 terminate at the edges of a crown portion 16 which extends circumferentially of the tire 10 and which includes a tread 18 outwardly thereof. The tire 10 includes a conventional carcass 20 which may be of one or more plies of either radial or bias tire cord fabric extending between the beads 12 for reinforcement of the tire 10. One or more belts or breakers 22 may be provided between the carcass 20 and the tread 18.

Figure 2:
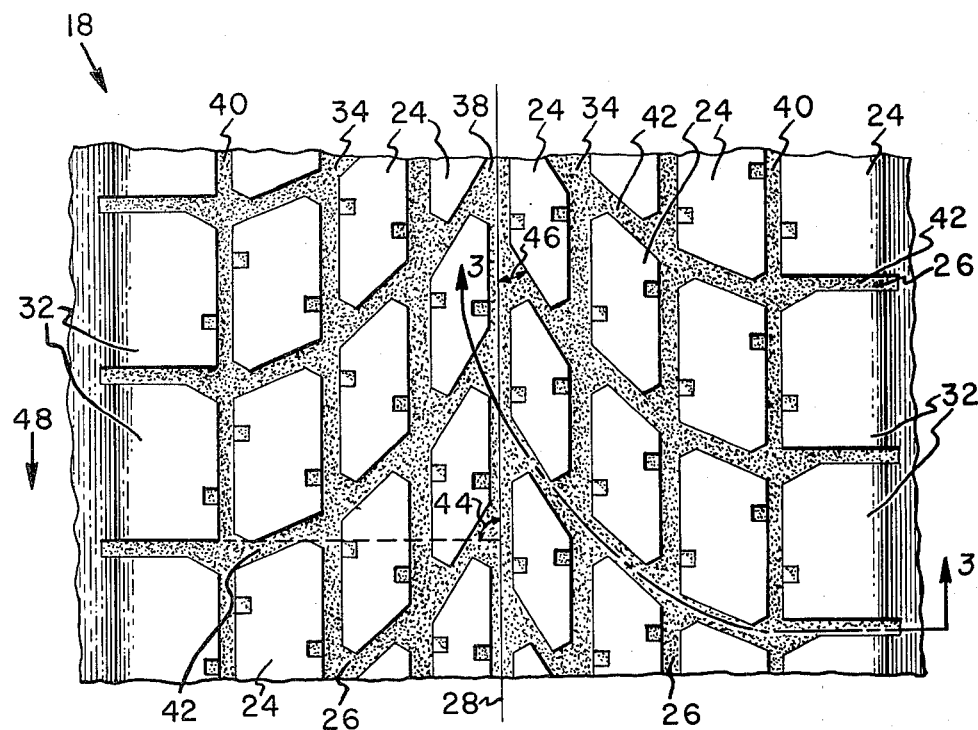
FIG. 2 is a slightly enlarged plan view of a portion of the tread of the tire of FIG. 1.

The tire 10 is a racing tire whose tread 18 is constructed, as best shown in FIG. 2 and as will be described in detail hereinafter, for use in both wet and drying track conditions. The term "racing tire" is defined, for the purposes of this specification and the claims, as a tire designed for racing at speeds in excess of 100 miles per hour (160 km. per hour).

As shown in FIG. 2, the tread 18 is provided with a plurality of tread elements 24 which are separated by a network of grooves 26. In order to provide sufficient traction during periods of rain or periods when the track is wet, the tread 18 is provided over a substantial portion thereof with grooves which are sufficiently deep, wide, and closely spaced to remove the water entering the tread contact patch. However, such a tread pattern provided throughout the width of the tread 18 may result in blistering of tread elements in the shouler regions of a tire especially while cornering at high speeds during dry or drying conditions. Therefore, the tread elements in the shoulder regions are provided with a combination of larger surface area, less height, and a shape which will provide sufficient stability to prevent blistering due to squirm of the tread elements as the tire travels through the footprint. In other words, a tire for use in road races in both wet and drying track conditions should have a large void volume for evacuation of water in the central region and tread elements which have high stability to prevent blistering in the shoulder areas.

In order to provide such a tire, in accordance with one aspect of this invention, the groove network 26 has a minimum depth within a distance from each tread edge equal to 20 percent of the tread width which minimum depth is less than about 0.15 inches (0.38 cm). The tread edges are determined by the axially outermost points of a tire which touch the ground as the tire travels through its footprint when mounted on a vehicle under rated pressure and load. The term "axially", as used herein, refers to a direction parallel to a tire's rotational axis. A "mid-circumferential plane" is defined herein as a plane which is perpendicular to the rotational axis of a tire and which lies midway between the tread edges. The mid-circumferential plane of tire 10 is illustrated at 28 in the drawings. The tread width is determined from the tire's footprint at the widest points thereof. Groove network depth is measured in a direction perpendicular to the tire's rotational axis and is illustrated at 30 in FIG. 3. In accordance with a preferred embodiment of this invention, the groove network depth within a distance of 20 percent of the tread width from each tread edge is equal to less than 0.10 inch (0.25 cm). This embodiment is meant to encompass a groove network depth within 20 percent of tread width from each tread edge which is equal to zero; that is, the absence of grooves within 20 percent of tread width from each tread edge.

In order to provide sufficient groove depth for water evacuation in the center regions of the tread during periods of use on a wet track, the groove network has a maximum depth within a distance of 10 percent of the tread width from both sides of the mid-circumferential plane 28 which maximum depth is preferably equal to at least the lesser of 0.20 inches (0.51 cm) and 2.5 percent of the tread width.

Figure 3:
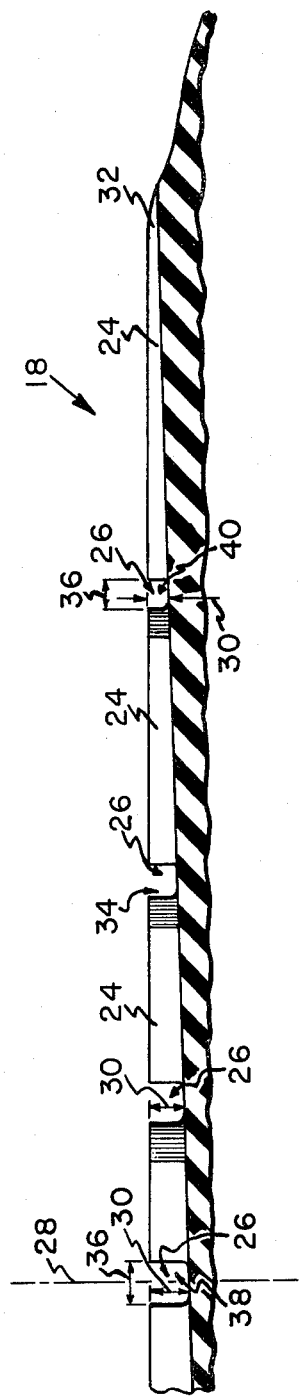
FIG. 3 is an enlarged partial cross-section of the tread portion of FIG. 2 taken along line 3—3 thereof.

The groove network depth preferably progressively increases as the groove network 26 extends in a direction across the tread from each tread edge to the mid-circumferential plane as best shown in FIG. 3. By the term "progressively increases" as applied to the groove network depth is meant an overall pattern of increase in groove network depth such as in incremental stages of in a geometric progression so that as each transverse groove of the groove network extends across the tread toward the mid-circumferential plane 28, the groove depth generally increases, and each circumferential groove is generally shallower than other circumferential grooves spaced closer to the mid-circumferential plane but deeper than other circumferential grooves spaced further from the mid-circumferential plane.

Of course, the groove network depth "progressively increases" as long as there is an overall pattern of increase in groove network depth even though there may be an occasional decrease in groove network depth as the groove network 26 extends in a direction across the tread from each tread edge to the mid-circumferential plane.

In accordance with another aspect of this invention those tread elements such as those shown at 32, which are disposed at least partially within a distance of 20 percent of the tread width from a respective tread edge (hereinafter referred to as the "outer group of tread elements") each have a ground-contacting surface area equal to at least about 2 square inches to aid in providing sufficient stability of the tread elements 32 so that blistering due to squirm of the tread elements in the shoulder regions does not occur while cornering at high speeds in dry or drying conditions. On the other hand, in order to provide sufficient void in the central region of the tread for water evacuation during driving at high speeds in wet track conditions, a central zone of the tread 18 which extends over the width of the tread 18 from the mid-circumferential plane 28 toward each tread edge a distance of 10 percent of the tread width (for a total width of the central zone equal to 20 percent of tread width) has a net-to-gross ratio which is not greater than about 65 percent. By "net-to-gross ratio" is meant the ratio of the total ground-contacting surface area of the tread elements or portions of tread elements in the central zone to the product of the width of the central zone and the circumference of the tread at the mid-circumferential plane 28.

In accordance with another aspect of this invention, the groove network 26 includes circumferential grooves 34 the widths of which progressively decrease as their respective distances from the mid-circumferential plane 28 increase from a greater width at the mid-circumferential plane 28 to a lesser width at or near each tread edge in order to provide a maximum amount of void in the central area of the tread for water evacuation and to provide a maximum tread element surface area for maximum stability of the tread elements in the shoulder regions for prevention of blistering while cornering at high speeds during dry or drying track conditions. Circumferential groove width is illustrated at 36 in FIG. 3 and is measured in a direction perpendicular to a wall of a groove at the ground-engaging surface of the tread. In accordance with a preferred embodiment of this invention, the width of the circumferential groove 38 nearest the mid-circumferential plane 28 is at least 40 percent greater than the width of the circumferential groove 40 nearest each tread edge.

In addition to the size and height, it is also preferable for providing greatest stability to the tread elements in the outer group of tread elements that they have certain shapes. For example, if they have sharp corners such as are found in triangular-shaped elements or if they are excessively long as compared to their width, their stability may be decreased markedly. Therefore, in accordance with a preferred embodiment of this invention, each of the outer group of tread elements has a width which is at least 90 percent of the length thereof. In accordance with another preferred embodiment of this invention, the ground-contacting surface of each of the outer group of tread elements is substantially rectangular in shape.

In accordance with another aspect of this invention, the groove network 26 is provided with transverse grooves 42 as well as circumferential grooves 34 for more efficient evacuation of water from the footprint. It is believed that a more efficient evacuation of water from the tread footprint can be achieved if it is evacuated via a path along which it would naturally otherwise flow. Therefore, it is preferable that each of the transverse grooves 42 extend from the mid-circumferential plane 28 to a tread edge at an angle relative to the mid-circumferential plane 28 at the respective tread edge which is greater than about 75 degrees as shown at 44 in FIG. 2, and each transverse groove 42 further preferably extends at an angle relative to and at the mid-circumferential plane 28 which is less than about 40 degrees as shown at 46 in FIG. 2, the angle at which each transverse groove 42 extends relative to the mid-circumferential plane 28 progressively decreasing as the transverse groove 42 extends across the tread from each tread edge to the mid-circumferential plane 28 as clearly shown in FIG. 2. All of these transverse grooves 42 preferably extend from the mid-circumferential plane 28 in the same circumferential direction as illustrated at 48 in FIG. 2 to direct the water as much as possible in its direction of natural flow. Such a tire may be called a "directional tire" and is mounted on a vehicle such that the portion of each transverse groove 42 at the mid-circumferential plane 28 will enter the footprint first as the tire goes through the footprint.

In addition to racing tires, this invention may also be useful in other types of tires such as wherein it is important to evacuate water from the tread contact patch during wet conditions while also preventing the tread elements in the shoulder regions from blistering during high-speed driving under dry or drying road surface conditions.

While certain representative embodiments and details have been shown for the purpose of illustrating the invention, it will be apparent to those skilled in the art that various changes and modifications may be made therein without departing from the spirit or scope of the invention.

What is claimed is:

1. A tire comprising a tread having a plurality of tread elements separated by a network of grooves, said groove network having a maximum depth within a distance from both sides of the mid-circumferential plane of the tire of 10 percent of the tread width, said maximum depth being equal to at least the lesser of 0.20 inch and 2.5 percent of tread width, said groove network further having a minimum depth within a distance from each tread edge of 20 percent of the tread width, said minimum depth being equal to less than about 0.15 inch.

2. A tire comprising a tread having a plurality of tread elements separated by a network of grooves, said groove network having a depth which is less than about 0.15 inch within a distance from each tread edge of 20 percent of tread width, and said network depth progressively increases as said groove network extends in a direction across the tread from each tread edge to the mid-circumferential plane of the tire.

3. A tire according to claim 2, wherein said groove network depth is less than 0.10 inch within a distance from each tread edge of 20 percent of tread width.

4. A tire according to claim 3, wherein said plurality of tread elements includes an outer group of tread elements, each of said outer group of tread elements is disposed at least partially within a distance equal to 20 percent of the tread width from a respective tread edge and has a ground-contacting surface area equal to at least about two square inches.

5. A tire according to claim 3, wherein said groove network depth is equal to at least the lesser of 0.20 inch and 2.5 percent of tread width within a distance from both sides of the mid-circumferential plane of the tire of 10 percent of tread width.

6. A tire according to claim 5, wherein said groove network includes circumferential and transverse grooves, said transverse grooves extending from the mid-circumferential plane of the tire to a tread edge at an angle relative to the mid-circumferential plane at the respective tread edge which is at least about 75 degrees, said transverse grooves further extending at an angle relative to and at the mid-circumferential plane which is less than about 40 degrees.

7. A tire according to claim 5, wherein said groove network includes circumferential and transverse grooves, the width of said circumferential grooves generally progressively decreasing as their respective distances from the mid-circumferential plane of the tire increase.

8. A tire according to claim 5, wherein said tread further has a circumferentially extending central zone which extends over the width of the tread from the mid-circumferential plane of the tire toward each tread edge a distance of 10 percent of tread width, said central zone having a net-to-gross ratio which is less than about 65 percent.

9. A tire according to claim 8, wherein said plurality of tread elements includes an outer group of tread elements, each of said outer group of tread elements being disposed at least partially within a distance equal to 20 percent of the tread width from a respective tread edge and having a ground-contacting surface area equal to at least about two square inches.

10. A tire according to claim 9, wherein said groove network includes circumferential and transverse grooves, the widths of said circumferential grooves progressively decreasing as their respective distances from the mid-circumferential plane of the tire increase.

11. A racing tire comprising a tread having a plurality of tread elements separated by a network of circumferential and transverse grooves, said transverse grooves extending from the mid-circumferential plane of the tire to a tread edge at an angle relative to the mid-circumferential plane at the respective tread edge which is greater than about 75 degrees, said transverse grooves further extending at an angle relative to and at the mid-circumferential plane which is less than about 40 degrees.

12. A tire according to claim 11, wherein said groove network has a maximum depth within a distance from both sides of the mid-circumferential plane of 10 percent of the tread width, said maximum depth being equal to at least the lesser of 0.20 inch and 2.5 percent of tread width, and said groove network further has a minimum depth within a distance from each tread edge of 20 percent of the tread width, said minimum depth being less than about 0.15 inch.

13. A tire according to claim 11, wherein the widths of said circumferential grooves progressively decrease as their respective distances from the mid-circumferential plane of the tire increase.

14. A tire comprising a tread having a plurality of tread elements separated by a network of grooves and including an outer group of tread elements each of which is disposed at least partially within a distance equal to 20 percent of the tread width from a respective tread edge and each of which has a ground-contacting surface area equal to at least about two square inches, said tread further having a circumferentially extending central zone which extends over the width of the tread from the mid-circumferential plane of the tire toward each tread edge a distance of 10 percent of tread width, said central zone having a net-to-gross ratio which is less than about 65 percent.

15. A tire according to claim 14, wherein said network of grooves includes circumferential and transverse grooves, said transverse grooves extending from the mid-circumferential plane of the tire to a tread edge at an angle relative to the mid-circumferential plane at the respective tread edge which is greater than about 75 degrees, said transverse grooves further extending at an angle relative to and at the mid-circumferential plane which is less than about 40 degrees.

16. A tire according to claim 14, wherein said groove network includes circumferential and transverse grooves, the widths of said circumferential grooves progressively decreases as their respective distances from the mid-circumferential plane of the tire increase.

17. A tire according to claim 14, wherein said groove network has a maximum depth within a distance from both sides of the mid-circumferential plane of the tire of 10 percent of the tread width, said maximum depth being equal to at least the lesser of 0.20 inch and 2.5 percent of tread width, said groove network further having a minimum depth within a distance from each tread edge of 20 percent of the tread width, said minimum depth being less than about 0.15 inch.

18. A tire according to claim 17, wherein said network of grooves includes circumferential and transverse grooves, said transverse grooves extending from the mid-circumferential plane of the tire to a tread edge at an angle relative to the mid-circumferential plane at the respective tread edge which is greater than about 75 degrees, said transverse grooves further extending at an angle relative to and at the mid-circumferential plane which is less than about 40 degrees.

19. A tire according to claim 17, wherein said groove network includes circumferential and transverse grooves, the widths of said circumferential grooves progressively decrease as their respective distances from the mid-circumferential plane of the tire increase.

20. A tire comprising a tread having a plurality of tread elements separated by a network of circumferential and transverse grooves, the widths of said circumferential grooves progressively decrease as their respective distances from the mid-circumferential plane of the tire increase.

21. A tire according to claim 20, wherein the width of said circumferential groove nearest the mid-circumferential plane of the tire is at least about 40 percent greater than the width of said circumferential groove nearest each tread edge.

22. A tire according to any one of claims 6, 11, 12, 13, 15, or 18, wherein some of said transverse grooves extend from the mid-circumferential plane of the tire toward one tread edge and the rest of said transverse grooves extend from the mid-circumferential plane toward the other tread edge, and all of said transverse grooves extend from the mid-circumferential plane in the same circumferential direction.

23. A tire according to any one of claims 4, 9, 10, or 14 through 19, wherein each of said outer group of tread elements has a width which is at least 90 percent of the length thereof.

24. A tire according to claim 23, wherein the ground-contacting surface of each of said outer group of tread elements is substantially rectangular.

25. A tire according to any one of claims 4, 9, 10 or 14 through 19, wherein the ground-contacting surface of each of said outer group of tread elements is substantially rectangular.

26. A tire according to any one of claims 1 through 10, or 14 through 21, wherein the tire is a racing tire.

27. A tire according to any one of claims 1, 2, 8, or 14, wherein the tread is devoid of grooves within a distance of 20 percent of tread width of each tread edge.

28. A tire according to claim 27, wherein the tire is a racing tire.

29. The tire according to claim 1 wherein the depths of the grooves comprising the groove network generally progressively decrease as their respective distances from the mid-circumferential plane of the tire increase.

30. The tire according to claim 1 wherein the tread thickness generally progressively decreases from the mid-circumferential plane of the tire to the tread edge.

31. The tire according to claim 2 wherein the tread thickness generally progressively decreases from the mid-circumferential plane of the tire to the tread edge.

32. A tire comprising a tread having a plurality of tread elements separated by a network of grooves, the widths of the grooves comprising the groove network, generally progressively decreasing as their respective distances from the mid-circumferential plane of the tire increase, wherein the groove network includes transverse grooves, said transverse grooves extending from the mid-circumferential plane of the tire to a tread edge at an angle relative to the mid-circumferential plane at the respective tread edge which is at least about 75°, said transverse grooves further extending at an angle relative to and at the mid-circumferential plane which is less than about 40°.

33. A tire comprising a tread having a plurality of tread elements separated by a network of grooves, the depths of the grooves comprising the groove network, generally progressively decreasing as their respective distances from the mid-circumferential plane of the tire increase, wherein the groove network includes transverse grooves extending from the mid-circumferential plane of the tire to a tread edge at an angle relative to the mid-circumferential plane at the respective tread edge which is at least about 75°, said transverse grooves further extending at an angle relative to and at the mid-circumferential plane which is less than about 40°.

* * * * *